(12) United States Patent
Leucht-Roth et al.

(10) Patent No.: US 11,019,184 B2
(45) Date of Patent: *May 25, 2021

(54) DATA PROCESSING DEVICE AND METHOD FOR OFFLOADING DATA TO REMOTE DATA PROCESSING DEVICE

(71) Applicant: Intel IP Corporation, Santa Clara, CA (US)

(72) Inventors: Ulrich Leucht-Roth, Munich (DE); Xiaoning Nie, Neubiberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,696

(22) Filed: Aug. 23, 2019

(65) Prior Publication Data

US 2020/0053191 A1 Feb. 13, 2020

Related U.S. Application Data

(63) Continuation of application No. 15/497,764, filed on Apr. 26, 2017, now Pat. No. 10,440,158.

(30) Foreign Application Priority Data

Jun. 1, 2016 (DE) .......................... 102016110078.1

(51) Int. Cl.
*H04L 29/06* (2006.01)
*H04W 72/04* (2009.01)
*H04L 29/08* (2006.01)
*H04L 12/861* (2013.01)

(52) U.S. Cl.
CPC .............. *H04L 69/22* (2013.01); *H04L 49/90* (2013.01); *H04L 69/323* (2013.01); *H04L 69/324* (2013.01); *H04W 72/0446* (2013.01)

(58) Field of Classification Search
None
See application file for complete search history.

(56) References Cited

U.S. PATENT DOCUMENTS 6,032,190 A * 2/2000 Bremer .................. H04L 49/25
370/389
6,591,302 B2 7/2003 Boucher et al.
10,440,158 B2 10/2019 Leucht-Roth et al.
(Continued)

OTHER PUBLICATIONS

U.S. Appl. No. 15/497,764 U.S. Pat. No. 10,440,158, filed Apr. 26, 2017, Data Processing Device and Method for Offloading Data to Remote Data Processing Device.
(Continued)

*Primary Examiner* — Saba Tsegaye
(74) *Attorney, Agent, or Firm* — Schwegman Lundberg & Woessner, P.A.

(57) ABSTRACT

The disclosure relates to a data processing device, comprising: a processing element configured to process a plurality of data packets according to a communication protocol to provide a plurality of processed data packets each comprising a first part and a second part; and an interface configured to offload the second parts of the plurality of processed data packets to a remote data processing device and configured to notify the remote processing device of the offload of the second parts of the plurality of processed data packets.

17 Claims, 6 Drawing Sheets

(56) References Cited

U.S. PATENT DOCUMENTS

| | | | |
|---|---|---|---|
| 2003/0159040 A1* | 8/2003 | Hashimoto | G06F 21/35 |
| | | | 713/168 |
| 2007/0140297 A1 | 6/2007 | Chung et al. | |
| 2008/0195781 A1* | 8/2008 | Kim | G06F 13/387 |
| | | | 710/105 |
| 2009/0106436 A1 | 4/2009 | Andersson et al. | |
| 2010/0325393 A1* | 12/2010 | Lerzer | H04L 1/1829 |
| | | | 712/36 |
| 2011/0235575 A1 | 9/2011 | Tapia et al. | |
| 2015/0127849 A1 | 5/2015 | Luo et al. | |
| 2016/0285767 A1 | 9/2016 | Brandeburg et al. | |
| 2017/0353586 A1 | 12/2017 | Leucht-Roth et al. | |
| 2018/0124637 A1* | 5/2018 | Kim | H04W 52/367 |

OTHER PUBLICATIONS

"U.S. Appl. No. 15/497,764, Non Final Office Action dated Jan. 25, 2019", 16 pgs.

"U.S. Appl. No. 15/497,764, Notice of Allowance dated May 29, 2019", 10 pgs.

"U.S. Appl. No. 15/497,764, Response to Non Final Office Action dated Jan. 25, 2019", 8 pgs.

\* cited by examiner

DATA PROCESSING DEVICE AND METHOD FOR OFFLOADING DATA TO REMOTE DATA PROCESSING DEVICE

This application is a continuation of U.S. patent application Ser. No. 15/497,764, filed Apr. 26, 2017, now U.S. Pat. No. 10,440,158, which claims the benefit of priority to German Patent Application No. 10 2016 110078.1, filed Jun. 1, 2016, each of which is incorporated herein by reference in its entirety.

FIELD

The disclosure relates to a data processing device with an interface for offloading data to a remote data processing device, a remote data processing device for receiving the offloaded data and a method for offloading the data. The disclosure particularly relates to splitting the layer 2 (L2) buffer space of a cellular communication processor to a local and a remote part and offloading the remote part to an application processor memory via a shared memory interface as PCIe.

BACKGROUND

In wireless communication systems 100 such as exemplary illustrated in FIG. 1 data typically needs to be exchanged between the communication processor 101 also referred to as modem and the application processor 103 at high data rates. To allow such high data rates, a layer 2 (L2) buffer on the CP memory 105 is used for buffering data packets. However, CP memory 105 space is limited and used for storing data and code. It is thus desirable to provide a concept for reducing the L2 buffer space on the CP memory 105 without impacting the data rates between CP 101 and AP 103.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
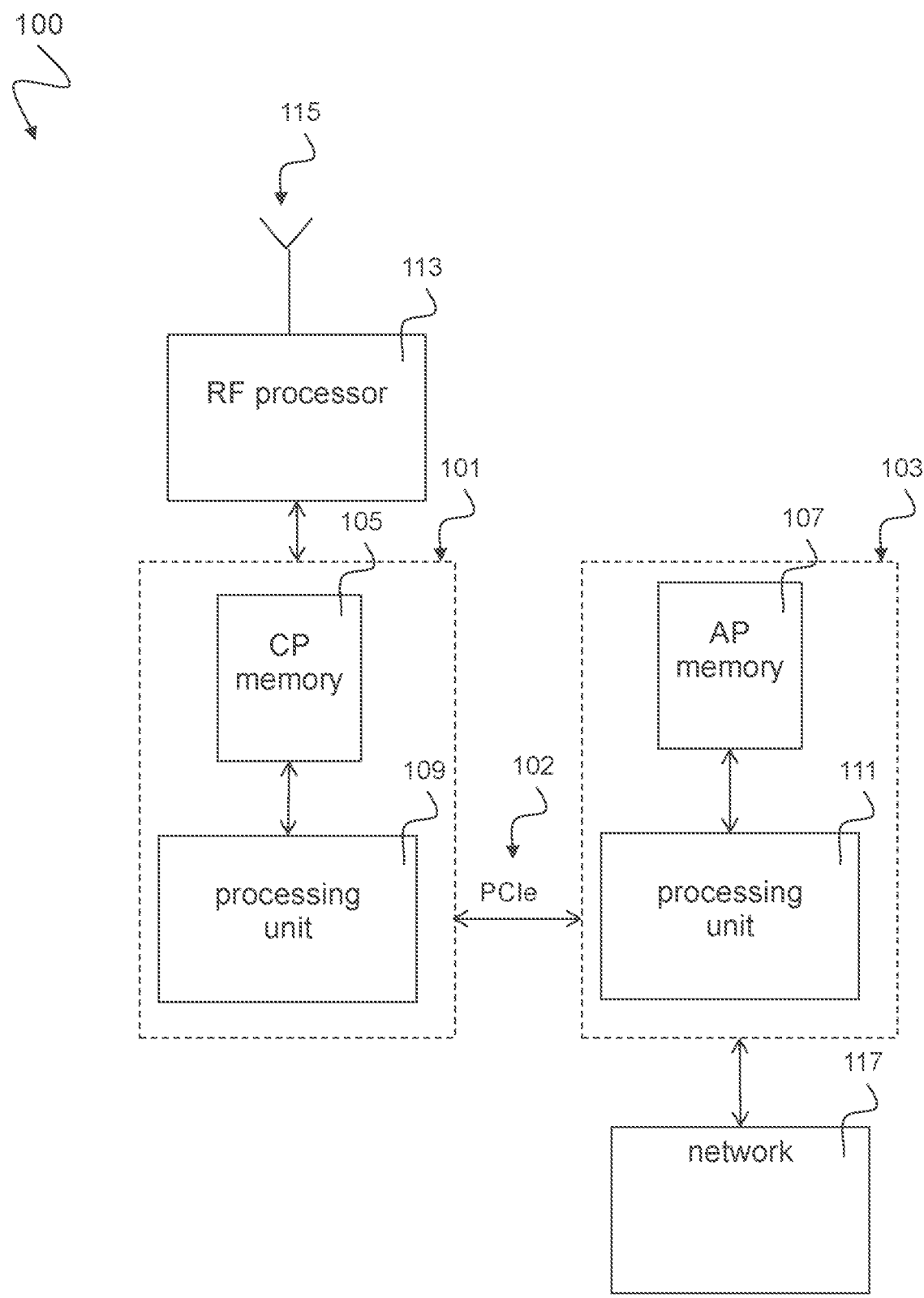
FIG. 1 is a block diagram of a wireless communication system 100 with a communication processor (CP) 101 and an application processor (AP) 103 coupled by a PCIe interface 102 for offloading data.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
CP: communication processor, modem
AP: application processor
PCI: Peripheral Component Interconnect
PCIe: PCI Express
IPC: inter-processor communication
L2: Layer 2 of cellular communication protocol according to OSI
DL: downlink
UL: uplink
ROHC: robust header compression
IP: internet protocol
IMS: IP multimedia system
VoIP: Voice over Internet Protocol
TTI: transmission time interval
C-PS: cellular protocol stack
PDCP: packet data convergence protocol
DMAC: direct memory access communication
PDU: protocol data unit
ATU: address translation unit
TD: transfer descriptor
MCM: memory and connection manager
MSI: Message signaled interrupt (part of PCIe standard)
MIPI: MIPI alliance (standardization)
LLI: low latency interface
DMI2: direct media interface version 2
DRAM: dynamic random access memory
3GPP: 3rd Generation Partnership Project
LTE: Long Term Evolution
LTE-A: LTE Advanced, Release 10 and higher versions of 3GPP LTE
RF: Radio Frequency
UE: User Equipment, mobile station
OFDM: Orthogonal Frequency Division Multiplex
NodeB: base station
MIMO: Multiple Input Multiple Output The methods and devices described herein may be based on communication processors, application processors, PCIe interfaces and inter-processor communication interfaces. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may be implemented in mobile devices (or mobile stations or User Equipment (UE)) and may also be applied to radio cells such as base stations (NodeB, eNodeB). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G, 5G LTE and beyond, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

The methods and devices described hereinafter may transmit data via a bus interface such as the PCIe bus. The PCI Express bus is a high-speed serial replacement of the older PCI/PCI-X bus. PCI Express is based on point-to-point topology, with separate serial links connecting every device to the host. The PCI Express bus link supports full-duplex communication between any two endpoints, with no inherent limitation on concurrent access across multiple endpoints. PCIe devices need to use PCIe addresses to send/receive packets over a PCIe link. The Address Translation Unit (ATU) within the PCIe module translates the device internal address into a PCIe address and vice versa. The PCIe address may be 32-bit or 64-bit, for example. For the outbound transaction, the outbound ATU translates the device internal address into a PCIe address. The data with a PCIe address is transferred over the PCIe link to the other device. For the inbound transaction, the Base Address Register (BAR) in the PCIe module accepts certain PCIe addresses and rejects the others. The data with an accepted PCIe address goes through the inbound ATU and is transferred to the device internal memory after address translation.

The methods and devices described hereinafter may transmit data via inter-processor communication (IPC) services. Inter-processor communication (IPC) defines the protocol and mode of operation which two system deploy to accomplish exchange of control and data plane related messages.

FIG. 1 is a block diagram of a wireless communication system 100 with a communication processor (CP) 101 and an application processor (AP) 103 coupled by a PCIe interface 102 for offloading data. The communication system can be applied for mobile communications, such as LTE, for example Release 13. A radio frequency (RF) processor 113 receives a downlink (DL) signal from an antenna 115, applies RF processing to the DL signal and transmits DL data packets to a communication processor (CP) 101 which includes a CP memory 105 for storing the received DL data packets and a processing unit 109 for L2 processing of the received DL data packets. An application processor (AP) 103 is coupled to the CP 101 via a PCIe interface 102 for processing higher protocol stacks. The AP 103 includes an AP memory 107 and a processing unit 111 and is coupled to a network 117 for forwarding the processed data to the corresponding sockets. The CP 101 may be a data processing device as described below with respect to FIGS. 2 to 5. The AP 103 may be a remote data processing device as described below with respect to FIGS. 2 to 5.

In one implementation related to LTE Release 13, for an 800 Mbps DL data transmission the required memory footprint has been estimated to be 21.9 MB including dual connectivity [(800 DL 12.5 MB+DC 6.1 MB)*1.175]. By using techniques according to the disclosure as described hereinafter, the memory footprint for L2 buffer storage (on CP memory 105) can be reduced to almost 0, i.e. to a few kBytes.

Figure 2:
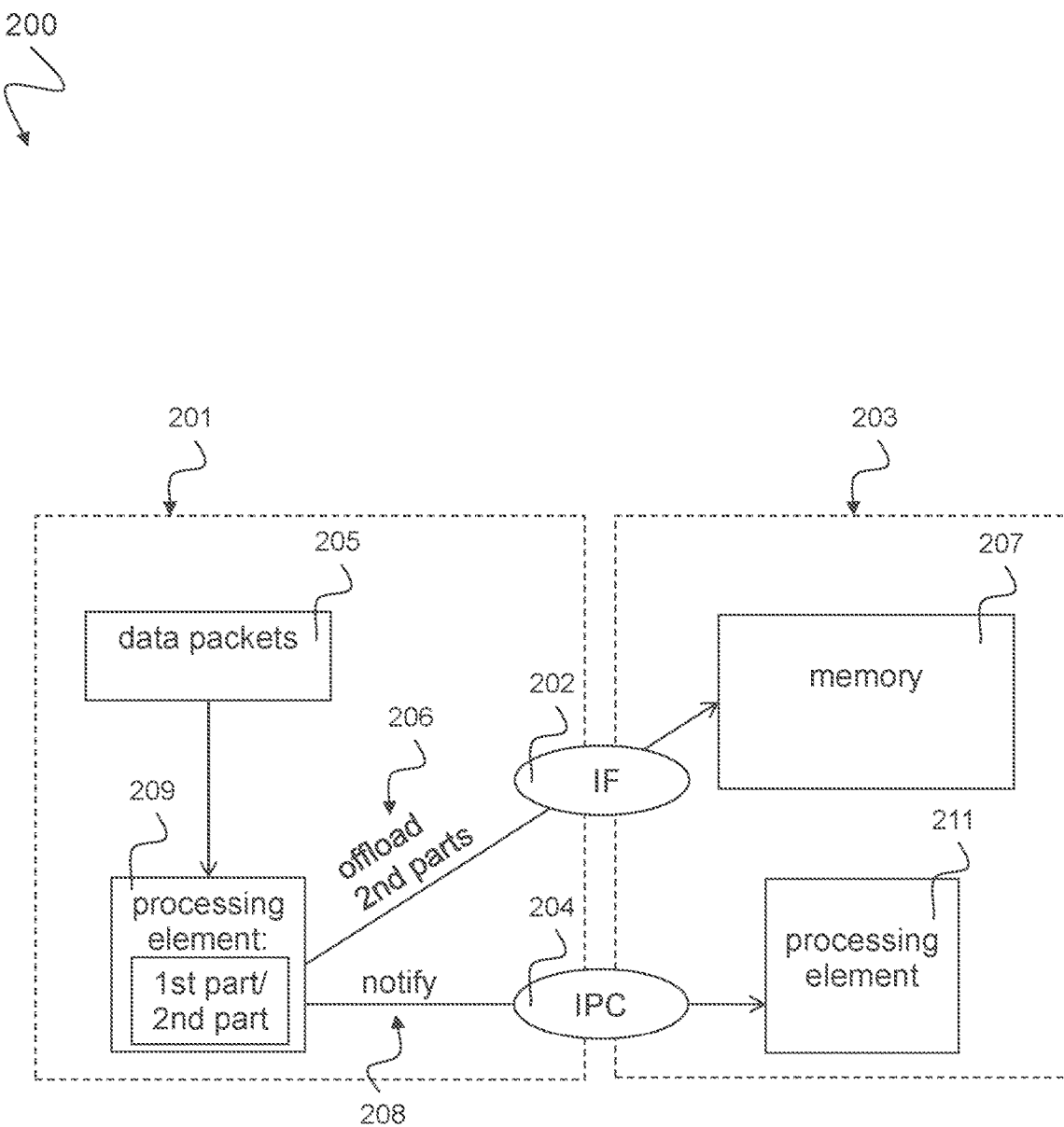
FIG. 2 is a block diagram of a communication system 200 with a communication processor (CP) 201 and an application processor (AP) 203 coupled by a physical interface 202 for offloading data. The physical interface may be a PCIe interface used for several purposes using logical channels.

FIG. 2 is a block diagram of a communication system 200 with a communication processor (CP) 201 and an application processor (AP) 203 coupled by a memory sharing 202 interface for offloading data.

The communication system 200 includes a data processing device (DPD) 201, e.g. a communication processor as described below with respect to FIGS. 3 to 5, and a remote data processing device 203, e.g. an application processor as described below with respect to FIGS. 3 to 5. The DPD 201 and the remote DPD 203 are coupled via an interface 202, e.g. a PCIe interface as described below with respect to FIGS. 3 to 5 and a service as inter-processor communication (IPC) described below with respect to FIGS. 3 to 5, for offloading data from the data processing device 201 to the remote data processing device 203.

The data processing device includes a processing element 209 and an interface 202. The processing element 209 processes a plurality of data packets 205 according to a communication protocol to provide a plurality of processed data packets, where each of the processed data packets includes a first part and a second part. The first part may include header data while the second part may include payload data.

The interface is configured to offload 206 the second parts of the plurality of processed data packets to the remote data processing device 203 and to notify 208 the remote processing device of the offload 206 of the second parts of the plurality of processed data packets. The second parts of the processed data packets may be offloaded to a memory 207 of the remote processing device 203. The notify 208 of the offload 206 is decoupled from the offloading 206 of the second parts of the processed data packets.

The processing element 209 may process a data packet of the plurality of data packets per single transmission time interval (TTI). The IPC service may notify the remote processing device of the offload per single TTI or per multiple TTIs.

The first parts of the processed data packets may include for example data headers of the respective data packets while the second parts of the processed data packets may include the user data of the respective data packets. The processing element 209 may decipher the plurality of data packets to provide the user data.

In an exemplary implementation the interface 202 may be a PCIe interface, e.g. as described below with respect to FIGS. 3 to 5, or a shared memory interface or an interface according to a bus protocol derived from PCI or an inter-processor communication, e.g. as described below with respect to FIGS. 3 to 5, or a die-to-die interface, a low latency interface or a network interface.

The processing element 209 may process the plurality of data packets according to a Layer 2 cellular network protocol, e.g. as described below with respect to FIGS. 3 to 5. The processing element 209 may re-order the plurality of data packets before offloading 206 the second parts of the plurality of processed data packets. The processing element 209 may process a RLC re-transmission protocol for re-ordering the plurality of data packets 205.

The data processing device 201 may include a first buffer to store the plurality of data packets 205 according to a Layer 1 cellular network protocol, e.g. a layer 1 buffer as described below with respect to FIGS. 3 to 5. The processing element 209 may retrieve the plurality of data packets 205 from the first buffer. The data processing device 201 may include a second buffer to store the first parts of the plurality of processed data packets 205, e.g. a layer 2 buffer as described below with respect to FIGS. 3 to 5.

The data processing device 201 may include an intermediate buffer to temporarily store the second parts of the plurality of processed data packets 205 before offloading 206 the second parts to the remote data processing device 203, e.g. an intermediate buffer as described below with respect to FIG. 5.

The data processing device 201 may include a second processing element to provide a location of the second parts of the plurality of processed data packets stored in the intermediate buffer to the interface for controlling the offloading 206 of the second parts, e.g. an IPC processor as described below with respect to FIG. 5. The intermediate buffer may have a size for storing an exemplary number of two or four second parts such as headers of the plurality of processed data packets.

The remote data processing device 203 includes an interface 202 and a memory 207. The interface 202 is configured to receive the plurality of second parts of processed data packets offloaded from the data processing device 201 and to receive the notification 208 from the data processing device 202 of the offload 206 of the second parts. The memory 207 is configured to store the plurality of second parts of processed data packets offloaded from the data processing device 201, e.g. as described below with respect to FIGS. 3 to 5. The memory 207 may be a shared memory between the DPD 201 and the remote DPD 203.

The notification 208 of the offload 206 is decoupled from the reception of the plurality of offloaded second parts of processed data packets.

The remote data processing device 203 includes a processing element 211 that retrieves the plurality of second parts of processed data packets from the memory 207 for further processing. The processing element 211 of the remote DPD 203 may retrieve the plurality of second parts of processed data packets from the memory 207 based on the notification 208 from the DPD 201.

The interface 202 may receive the second parts per single TTI. The IPC service 204 may receive the notification 208 from the data processing device 201 per single TTI or per multiple TTIs. The second parts of processed data packets may include user data, e.g. datagrams or IP packets as described below with respect to FIGS. 3 to 5. The second parts may be processed according to a Layer 2 cellular network protocol.

The plurality of second parts of processed data packets may be received in sequence according to an initial transmission sequence. The memory 207 may include a set of data buffers and a ring buffer of transfer descriptors. A transfer descriptor of the ring buffer may indicate a specific data buffer of the set of data buffers, e.g. as described below with respect to FIG. 4. The interface 202 may be configured to store the received plurality of second parts of processed data packets in the set of data buffers of the memory 207. The IPC service 204 may receive at least one transfer descriptor indicating the set of data buffers storing the received plurality of second parts of processed data packets, e.g. as described below with respect to FIG. 4.

The communication system 200 may be integrated on a single chip. The remote data processing device 203 may include a shared memory 207 for storing the second parts of the plurality of processed data packets. The data processing device 201 may include a dedicated memory for storing the first parts of the plurality of processed data packets. The dedicated memory may be protected against access from the remote data processing device 203.

Figure 3:
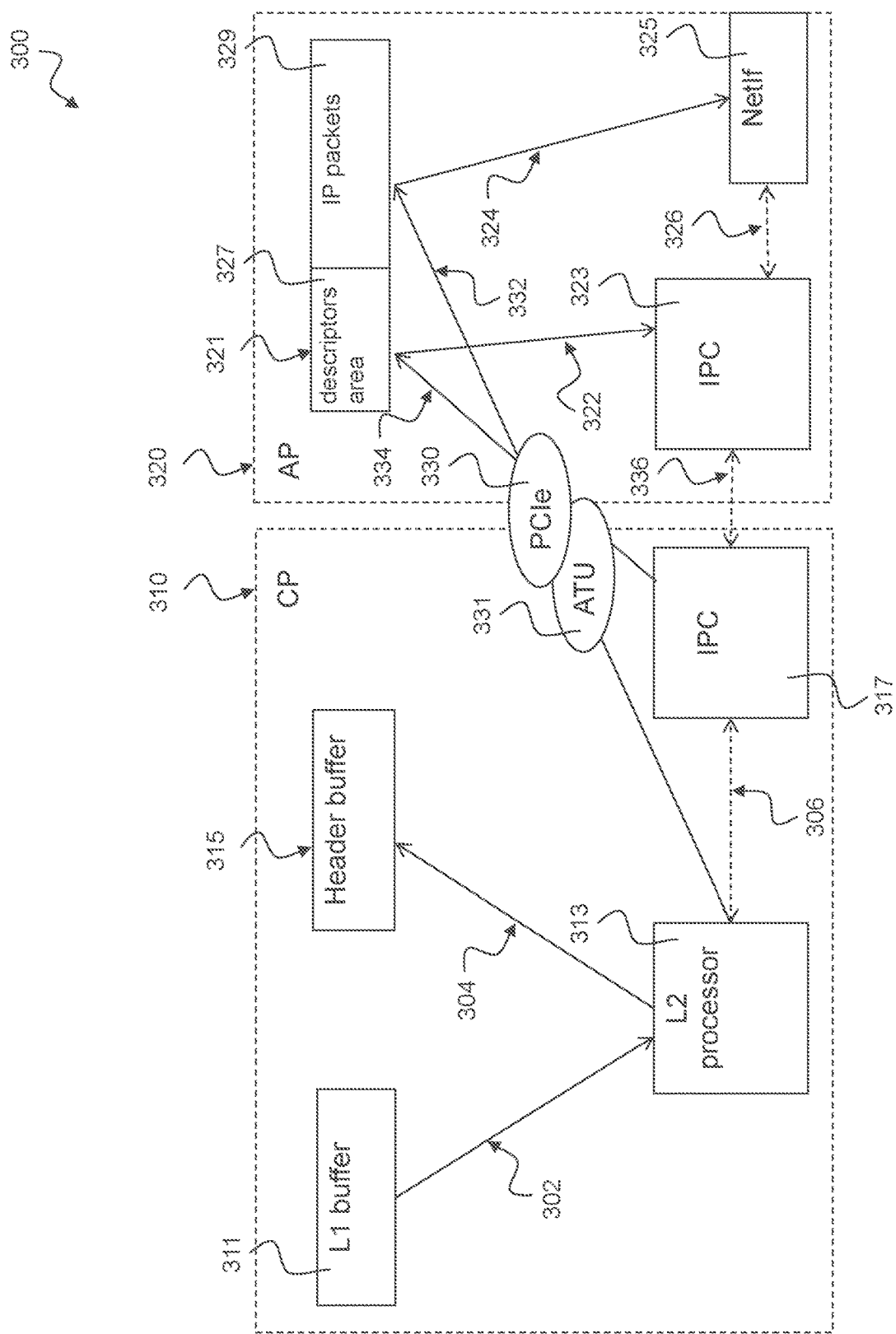
FIG. 3 is a block diagram of a communication system 300 with a communication processor (CP) 310 and an application processor (AP) 320 coupled by a PCIe interface 330 and an inter-processor communication (IPC) service 336 for offloading data. The IPC is using the PCIe interface. IPC is a SW layer as protocol on top of PCIe bus.

FIG. 3 is a block diagram of a communication system 300 with a communication processor (CP) 310 and an application processor (AP) 320 coupled by a PCIe interface 330 and an inter-processor communication (IPC) 336 for offloading data. The communication system 300 is an exemplary implementation of the communication system 200 described above with respect to FIG. 2.

The modem or communication processor (CP) 310 includes a layer 1 (L1) buffer 311, a layer 2 (L2) processor 313, a header buffer 315 and an inter-processor communication (IPC) 317. The L1 buffer 311 is used for buffering received data packets, e.g. data packets received from a radio frequency processor 113 as described above with respect to FIG. 1. The L2 processor retrieves data packets from the L1 buffer 311 and processes these data packets according to a L2 networking protocol including deciphering to provide processed data packets having a header part and a user data part. The user data part may include a datagram or IP packet. The header part is stored in the header buffer 315 while the user data part is transferred via a PCIe interface 330 to the application processor (AP) 320. After transfer of one or more user data parts, the IPC device 317 notifies the transfer to the AP 320 via an IPC service 336.

The AP 320 includes a buffer 321 with a descriptors area space 327 and an IP packets space 329, an IPC 323 and a network processor 325. The user data parts, i.e. IP packets transferred via the PCIe interface 330 by the CP 310 are stored in the IP packets space 329 of the buffer 321. Their location is indicated in the descriptors area 327 of the buffer 321 where descriptors describing the location of the IP packets in the buffer 321 are stored by the IPC 317 of the CP 310 when transferring the IP packets via the PCIe interface 330. The IPC 323 of the AP 320 may retrieve the descriptors from the descriptors area 327 of the buffer 321 and inform the network processor 325 about the location of the IP packets for further processing of the IP packets by the network processor 325.

The basic principle is to split the Layer 2 (L2) buffer space into local and remote part, referred herein as first part or header part and second part or IP packet part. The remote part is offloaded to application processor (AP) memory accessible via shared memory interface as PCIe. The storage of L2 protocol data units (PDUs) after de-ciphering is decoupled from the notification of IP packets to the network interface of the AP. Same principle is applicable for integrated modem or other shared memory interfaces.

The main use case for remote buffers is DL user data (IP datagrams) where Layer 2 buffer offloading is performed to remote AP DRAM, focusing on the 90% case. Use cases staying with local buffers are control plane, UL data and flows which require IP header manipulation, e.g. ROHC related IP header processing or addressing IP clients on modem side (IMS, VoIP). Furthermore host sleep with wake filters requires dynamic switch between remote and local buffer usage.

In the following an example for the main use case of downlink data transmission is described. The modem (CP) is represented by the block 310, while the AP is represented by the block 320. The upper blocks 311, 315, 321 show memory locations, while the lower blocks 313, 317, 323, 325 represent the processing elements. The operation in downlink direction includes the following steps: Per TTI received PDUs from layer 1 of cellular protocol stack (L1 C-PS) are locally stored on modem side 302. The layer 2 processing element PDCP is initiating the de-ciphering and datagrams (IP packets) are stored at L2 buffer space on AP side 332. PDU buffer are serviced from remote buffer pool located at AP memory. The de-cipher element (in L2 processor 313) can stay CP physically programmed, translation to host physical address is done via PCIe ATU 331 for direct PDU buffer access. After re-ordering and other cellular protocol stack (C-PS) L2 processing new data indication is sent to IPC driver per single TTI or per multiple TTIs 306. Triggered by the new data indication the IPC driver on modem side starts the transfer of IP packets 334, 332 to storage location on AP side over PCIe link 330. The received packets are then processed by the network interface on AP side 322, 324 and forwarded to the corresponding socket.

A local copy of first 16-128B (size configurable) of off-loaded PDU can be stored locally when required to simplify IP header inspection on CP side. Generally, an extremely tight integration between AP and CP on data plane and control of the same is achieved with respect to memory reduction, power save and performance. CP DRAM memory reduction is achieved by complete offload for remote buffers, e.g. about 21.9 MB. Power save is achieved by removal of CP DRAM access for PDU storage in memory and connection manager (MCM) buffers. Performance is increased by no processing of HW DMA descriptors by IPC driver for remote buffers.

Power efficiency over PCIe link requires race-to-off operation on transfers from PDB (i.e. layer 1 buffer) to remote buffers and performance-wise AP needs to guarantee latency and throughput during 1 TTI over PCIe link. The added complexity on AP side that AP IPDU allocation is restricted to ATU window (e.g. 256 MB to 1 GB) can be overcome by enabling host physically addressing towards the decipher engine. FIG. 4 described below shows the processing steps in some more detail.

Figure 4:
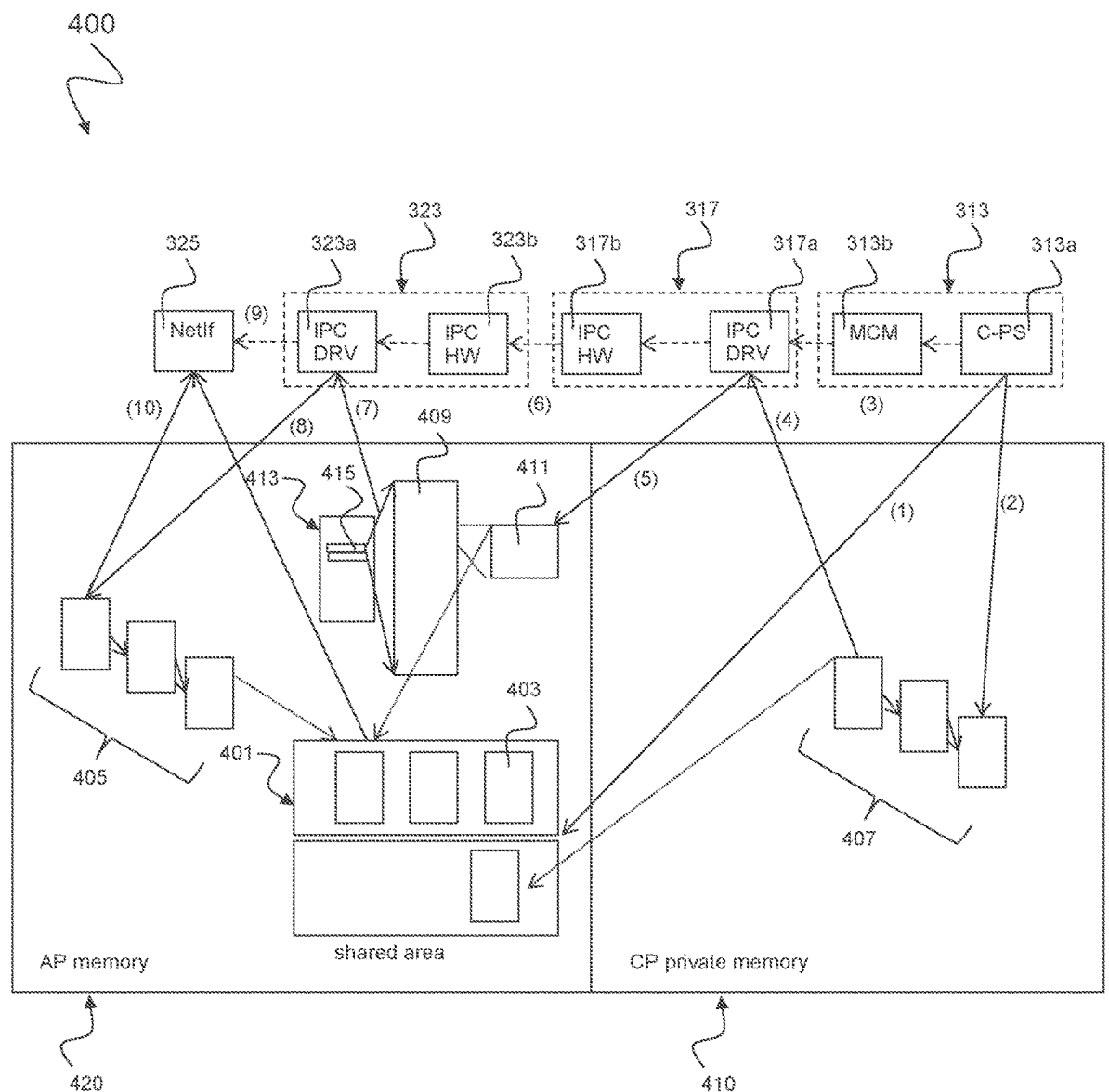
FIG. 4 is a schematic diagram of processing steps (1-10) according to a method 400 for processing data exchange between a CP 310 and an AP 320 of a communication system 300 as depicted in FIG. 3.

FIG. 4 is a schematic diagram of processing steps (1-10) according to a method 400 for processing data exchange between a CP 310 and an AP 320 of a communication system 300 as depicted in FIG. 3. The communication system 300 is an exemplary implementation of the communication system 200 described above with respect to FIG. 2.

The upper blocks 325, 323, 317, 313 show processing elements corresponding to the processing elements 325, 323, 317, 313 described above with respect to FIG. 3, while the lower blocks 401, 403, 405, 407, 409, 411, 413 represent data units.

Block 313, the L2 processor, includes a cellular protocol stack (C-PS) 313a and a memory and connection manager (MCM) 313b. Block 317, the IPC device of CP 310, includes IPC driver 317a and IPC hardware (HW) 317b. Block 323, the IPC device of AP 320, includes IPC driver 323a and IPC hardware (HW) 323b. IPC HW is PCIe There is a ring buffer 409 of transfer descriptors (TDs) for each logical pipe for each direction. FIG. 4 shows a DL TD ring buffer 409 for a single pipe. Each TD entry points to a packet in a container 401 on AP memory side 420. The ownership of buffers between AP and CP is managed by updating head and tail pointers of the TD ring buffers 409. The processing has as pre-condition: AP Netif 325 or IPC 323 has allocated empty container 401 and passed ownership to CP IPC DRV 317a via container ring buffer (not shown); and CP IPC 317 has provided container 401 to MCM 313b, mapping host physical address to CP physical address (inverse ATU lookup).

The processing steps are described in the following: In a first step (1) PDCP obtains via L2 coprocessor, i.e. C-PS 313a empty buffer from MCM 313b (allocated per PDU) and programs L2 coprocessor 313a, e.g. via EGDCI, to write deciphered datagrams to Data Buffers 403 located on containers 409 at AP side 420 (per 1-2 TTI). In a second step (2) PDCP updates segment descriptors 407 for written data buffers (per 1-2 TTI). In a third step (3) PDCP signals new data indication via cellular protocol stack (C-PS) 313a/ memory and connection manager (MCM) 313b to IPC 317 (per transfer interval, e.g. 2 ms). In a fourth step (4) CP IPC DRV 317a reads linked list of segment descriptors 407. In a fifth step (5), IPC DRV 317a updates TDR entries 411. In a sixth step (6), CP IPC DRV 317a signals new data indication, e.g. via media services interface (MSI), to AP IPC DRV 323a. In a seventh step (7) AP IPC DRV 323 reads new TDs, e.g. by using pointers 415 of control block 413 pointing to TDs in TD ring buffer 409. In an eighth step (8), AP IPC DRV 323a updates buffer descriptors 405. In a ninth step (9), AP IPC DRV 323a signals new data indication to NetIF 325. In a tenth step (10) NetIf 325 consumes datagrams. In an eleventh step (not depicted in FIG. 4) CP IPC DRV 317a hands data buffers back when completely used by MCM 313b (MCM notification) via BDR ring buffer (not shown). In a twelfth step (not depicted in FIG. 4) data buffers are freed when all datagrams are consumed (reference counter).

The time of storing deciphered PDUs (Step 1-2) is decoupled from the time the network interface 325 on AP side 420 is informed about IP packets (Steps 3ff) which are brought in sequence. Arbitrary re-transmission on cellular network side may occur in-between step 2 and step 3. A particular IP packet may reside several milliseconds on AP side 420 until AP is informed about that packet via an updated TD. An alternative implementation is shown below with respect to FIG. 5.

Figure 5:
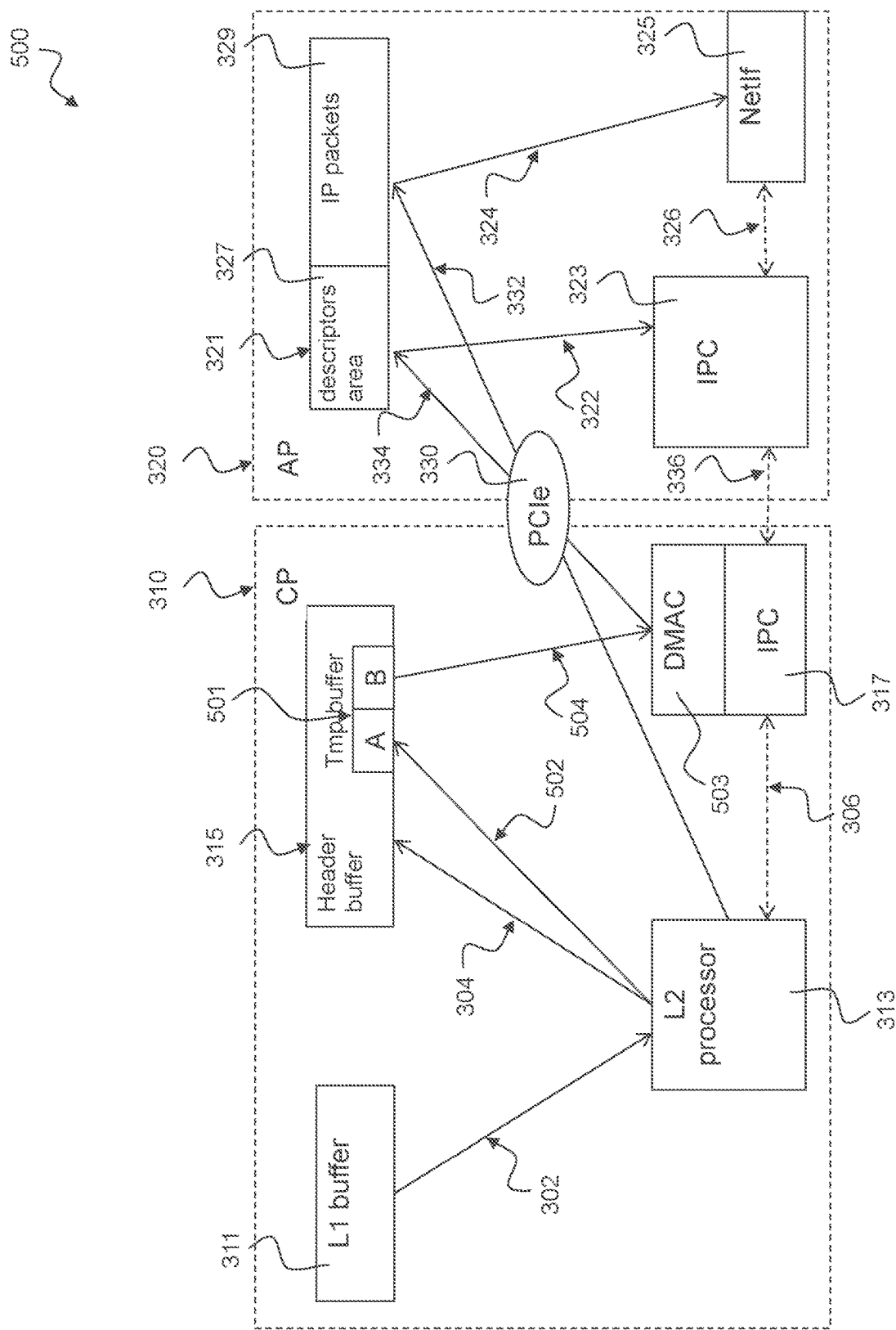
FIG. 5 is a block diagram of a communication system 500 with a communication processor (CP) 310 and an application processor (AP) 320 coupled by a PCIe interface 330 and inter-processor communication (IPC) service 336 for offloading data and an additional buffer for temporarily storing data to be exchanged.

FIG. 5 is a block diagram of a communication system 500 with a communication processor (CP) 310 and an application processor (AP) 320 coupled by a PCIe interface 330 and an inter-processor communication (IPC) 336 for offloading data and an additional buffer for temporarily storing data to be exchanged. The communication system 500 is an exemplary implementation of the communication system 200 described above with respect to FIG. 2. The communication system 500 corresponds to the communication system 300 described above with respect to FIGS. 3 and 4; however an additional L2 buffer 501 for temporarily storing data packets, for example two data packets A and B as depicted in FIG. 5, is included in the CP 310.

Here the intermediate temporary (Tmp) buffer is serviced with a PCIe DMA channel 503 towards AP 320. The push out may be controlled over double buffer switch, e.g. every 2nd TTI (or buffer status level). The advantage of this implementation of the communication system 500 is to reduce the critical throughput and latency dependency towards AP 320 over the PCIe link 330.

The communication system 500 provides still de-coupling of data movement from new data indication 306 to AP 320 by offloading Layer2 buffering for out-of-sequence PDUs. The CP DRAM memory reduction is slightly less for partial offload to remote buffers taking the tmp buffer space 501 into account. For example a 21.4 MB reduction (21.9 MB-0.5 MB) (2 TTI double buffer) may be achieved.

The communication system 500 mainly provides benefits with respect to decoupling of CP 310 and AP 320 since all PDU are still written/read to/from CP DRAM and IPC driver still needs to process DMA descriptors.

The communication systems 300 and 500 as described above with respect to FIGS. 3 to 5 allow re-partitioning processing tasks between CP 310 and AP 320. Layer 2 processing tasks of cellular protocol stack can be shifted to AP driver side together with the deciphered L2 PDUs.

Figure 6:
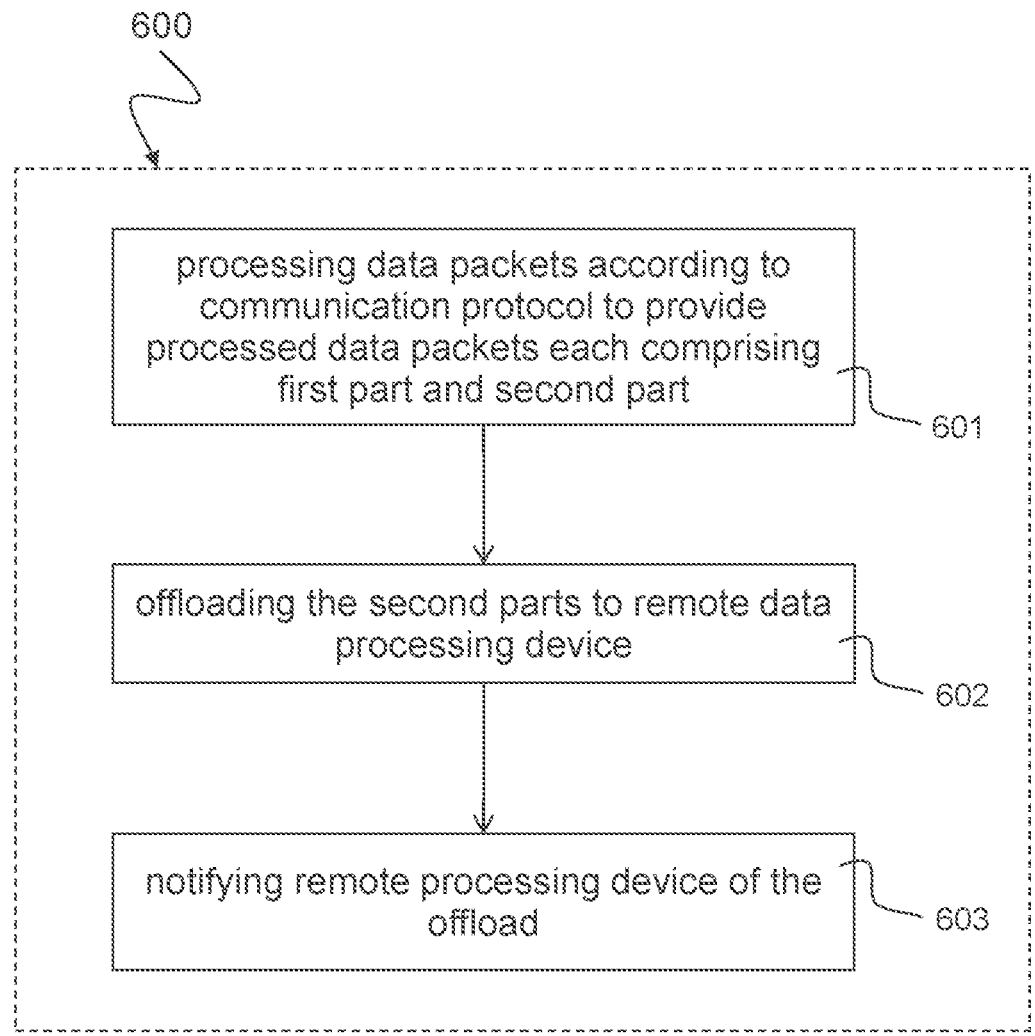
FIG. 6 is a schematic diagram of a method 600 for offloading data from a data processing device to a remote data processing device.

FIG. 6 is a schematic diagram of a method 600 for offloading data from a data processing device to a remote data processing device.

The method 600 includes processing 601 a plurality of data packets according to a communication protocol to provide a plurality of processed data packets each comprising a first part and a second part. The method 600 includes offloading 602 the second parts of the plurality of processed data packets to the remote data processing device. The method 600 includes notifying 603 the remote processing device of the offload of the second parts of the plurality of processed data packets.

The notifying 603 of the offload via the IPC service is decoupled from the offloading 602 of the second parts of the plurality of processed data packets.

The method 600 may further include: processing a data packet of the plurality of data packets per single transmission time interval (TTI); and notifying the remote processing device of the offload per single TTI or per multiple TTIs.

The first part of a processed data packet may include header data. The second part of a processed data packet may include user data. Processing the plurality of data packets may include deciphering the plurality of data packets to provide the user data.

The offloading may be performed via a physical interface, e.g. a PCIe interface, a shared memory interface or an interface according to a bus protocol derived from PCI. The notifying may be performed via an inter-processor communication service, a die-to-die interface, a shared memory interface, a low latency interface, a PCIe interface or a network interface.

Processing the plurality of data packets may include processing the plurality of data packets according to a Layer 2 cellular network protocol. Processing the plurality of data packets may include re-ordering the plurality of data packets before offloading the second parts of the plurality of processed data packets. Re-ordering the plurality of data packets may include processing according to a RLC retransmission protocol.

The method 600 may further include storing the plurality of data packets according to a Layer 1 cellular network protocol before processing the plurality of data packets. The method 600 may further include storing the first parts of the plurality of processed data packets.

The method 600 may further include temporarily storing the second parts of the plurality of processed data packets in an intermediate buffer before offloading the second parts to the remote data processing device. The method 600 may further include providing a location of the second parts of the plurality of processed data packets stored in the intermediate buffer for controlling the offloading of the second parts. The method 600 may further include temporarily storing a number of two or four second parts of the plurality of processed data packets in the intermediate buffer.

The method 600 may be performed on a data processing device 201 as described above with respect to FIG. 2 or on a CP 310 as described above with respect to FIGS. 3 to 5.

A corresponding method for offloading data from a data processing device to a remote data processing device as described below may be performed on a remote data processing device 203 as described above with respect to FIG. 2 or on an AP 320 as described above with respect to FIGS. 3 to 5.

The corresponding method includes receiving a plurality of second parts of processed data packets offloaded from the data processing device; receiving a notification from the processing device of the offload of the second parts; and storing the plurality of second parts of processed data packets offloaded from the data processing device in a memory of the remote data processing device.

The notification of the offload is decoupled from the reception of the plurality of offloaded second parts of processed data packets.

The corresponding method may further include retrieving the plurality of second parts of processed data packets from the memory for further processing. The retrieving may be based on the notification.

The methods, systems and devices described herein enable products with smaller and cheaper DRAM devices on CP side. The described techniques can be applied for implementing integrated modems where CP and AP are integrated in a single modem device which may be implemented on a single chip.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 600 and 400 as described above with respect to FIGS. 6 and 4. Such a computer program product may include a readable storage medium storing program code thereon for use by a processor, the program code comprising instructions for performing any of the method 400, 600 blocks as described above.

EXAMPLES

The following examples pertain to further embodiments. Example 1 is a data processing device, comprising: a processing element configured to process a plurality of data packets according to a communication protocol to provide a plurality of processed data packets each comprising a first part and a second part; and an interface configured to offload the second parts of the plurality of processed data packets to a remote data processing device and configured to notify the remote processing device of the offload of the second parts of the plurality of processed data packets.

In Example 2, the subject matter of Example 1 can optionally include that the notification of the offload is decoupled from the offloading of the second parts of the plurality of processed data packets.

In Example 3, the subject matter of any one of Examples 1-2 can optionally include that the processing element is configured to process a data packet of the plurality of data packets per single transmission time interval (TTI) and configured to notify the remote processing device of the offload per single TTI or per multiple TTIs.

In Example 4, the subject matter of any one of Examples 1-3 can optionally include that the first part of a processed data packet comprises header data; and that the second part of a processed data packet comprises user data.

In Example 5, the subject matter of Example 4 can optionally include that the processing element is configured to decipher the plurality of data packets to provide the user data.

In Example 6, the subject matter of any one of Examples 1-5 can optionally include that the interface is one of a PCIe interface, a shared memory interface or an interface according to a bus protocol derived from PCI.

In Example 7, the subject matter of any one of Examples 1-6 can optionally include that the processing element is configured to process the plurality of data packets according to a Layer 2 cellular network protocol.

In Example 8, the subject matter of any one of Examples 1-7 can optionally include that the processing element is configured to re-order the plurality of data packets before offloading the second parts of the plurality of processed data packets.

In Example 9, the subject matter of Example 8 can optionally include that the processing element is configured to process an RLC retransmission protocol for re-ordering the plurality of data packets.

In Example 10, the subject matter of any one of Examples 1-9 can optionally include a first buffer configured to store the plurality of data packets according to a Layer 1 cellular network protocol; and that the processing element is configured to retrieve the plurality of data packets from the first buffer.

In Example 11, the subject matter of any one of Examples 1-10 can optionally include a second buffer configured to store the first parts of the plurality of processed data packets.

In Example 12, the subject matter of any one of Examples 1-11 can optionally include an intermediate buffer configured to temporarily store the second parts of the plurality of processed data packets before offloading the second parts to the remote data processing device.

In Example 13, the subject matter of Example 12 can optionally include a second processing element configured to provide a location of the second parts of the plurality of processed data packets stored in the intermediate buffer to the interface for controlling the offloading of the second parts.

In Example 14, the subject matter of any one of Examples 12-13 can optionally include that the intermediate buffer has a size for storing two or four second parts of the plurality of processed data packets.

Example 15 is a remote data processing device, comprising: an interface configured to receive a plurality of second parts of processed data packets offloaded from a data processing device and configured to receive a notification from the data processing device of the offload of the second parts; and a memory configured to store the plurality of second parts of processed data packets offloaded from the data processing device.

In Example 16, the subject matter of Example 15 can optionally include that the notification of the offload is decoupled from the reception of the plurality of offloaded second parts of processed data packets.

In Example 17, the subject matter of any one of Examples 15-16 can optionally include a processing element configured to retrieve the plurality of second parts of processed data packets from the memory for further processing.

In Example 18, the subject matter of Example 17 can optionally include that the processing element is configured to retrieve the plurality of second parts of processed data packets from the memory based on the notification.

In Example 19, the subject matter of any one of Examples 15-18 can optionally include that the interface is configured to receive the second parts per single TTI and configured to receive the notification from the data processing device per single TTI or per multiple TTIs.

In Example 20, the subject matter of any one of Examples 15-19 can optionally include that the second parts of processed data packets comprise user data.

In Example 21, the subject matter of any one of Examples 15-20 can optionally include that the interface is one of a PCIe interface, a shared memory interface or an interface according to a bus protocol derived from PCI.

In Example 22, the subject matter of any one of Examples 15-21 can optionally include that the second parts comprise datagrams of data packets processed according to a Layer 2 cellular network protocol.

In Example 23, the subject matter of Example 22 can optionally include that the datagrams comprise internet protocol (IP) packets.

In Example 24, the subject matter of any one of Examples 15-23 can optionally include that the plurality of second parts of processed data packets are received in sequence according to an initial transmission sequence.

In Example 25, the subject matter of any one of Examples 15-24 can optionally include that the memory comprises a set of data buffers and a ring buffer of transfer descriptors, and that a transfer descriptor of the ring buffer indicates a specific data buffer of the set of data buffers.

In Example 26, the subject matter of Example 25 can optionally include that the interface is configured to store the received plurality of second parts of processed data packets in the set of data buffers of the memory.

In Example 27, the subject matter of Example 26 can optionally include that the interface is configured to receive at least one transfer descriptor indicating the set of data buffers storing the received plurality of second parts of processed data packets.

Example 28 is a communication system, comprising: a data processing device according to one of Examples 1 to 13; and a remote data processing device according to one of Examples 15 to 27, wherein the data processing device and the remote data processing device are coupled via the interface for offloading data from the data processing device to the remote data processing device.

In Example 29, the subject matter of Example 28 can optionally include that the communication system is integrated on a single chip.

In Example 30, the subject matter of any one of Examples 29-29 can optionally include that the remote data processing device comprises a shared memory for storing the second parts of the plurality of processed data packets.

In Example 31, the subject matter of any one of Examples 28-30 can optionally include that the data processing device comprises a dedicated memory for storing the first parts of the plurality of processed data packets, and that the dedicated memory is protected against access from the remote data processing device.

In Example 32, the subject matter of any one of Examples 28-31 can optionally include that the data processing device comprises a communication processor; and that the remote data processing device comprises an application processor.

Example 33 is a method for offloading data from a data processing device to a remote data processing device, the method comprising: processing a plurality of data packets according to a communication protocol to provide a plurality of processed data packets each comprising a first part and a second part; offloading the second parts of the plurality of processed data packets to the remote data processing device; and notifying the remote processing device of the offload of the second parts of the plurality of processed data packets.

In Example 34, the subject matter of Example 33 can optionally include that the notifying of the offload is decoupled from the offloading of the second parts of the plurality of processed data packets.

In Example 35, the subject matter of any one of Examples 33-34 can optionally include: processing a data packet of the plurality of data packets per single transmission time interval (TTI); and notifying the remote processing device of the offload per single TTI or per multiple TTIs.

In Example 36, the subject matter of any one of Examples 33-35 can optionally include that the first part of a processed data packet comprises header data; and that the second part of a processed data packet comprises user data.

In Example 37, the subject matter of Example 36 can optionally include that processing the plurality of data packets comprises deciphering the plurality of data packets to provide the user data.

In Example 38, the subject matter of any one of Examples 33-37 can optionally include that the offloading is performed via an interface that is one of a PCIe interface, a shared memory interface or an interface according to a bus protocol derived from PCI.

In Example 39, the subject matter of any one of Examples 33-38 can optionally include that processing the plurality of data packets comprises processing the plurality of data packets according to a Layer 2 cellular network protocol.

In Example 40, the subject matter of any one of Examples 33-39 can optionally include that processing the plurality of data packets comprises re-ordering the plurality of data packets before offloading the second parts of the plurality of processed data packets.

In Example 41, the subject matter of Example 40 can optionally include that re-ordering the plurality of data packets comprises processing according to an RLC retransmission protocol.

In Example 42, the subject matter of any one of Examples 33-41 can optionally include: storing the plurality of data packets according to a Layer 1 cellular network protocol before processing the plurality of data packets.

In Example 43, the subject matter of any one of Examples 33-42 can optionally include: storing the first parts of the plurality of processed data packets.

In Example 44, the subject matter of any one of Examples 33-43 can optionally include: temporarily storing the second parts of the plurality of processed data packets in an intermediate buffer before offloading the second parts to the remote data processing device.

In Example 45, the subject matter of Example 44 can optionally include: providing a location of the second parts of the plurality of processed data packets stored in the intermediate buffer for controlling the offloading of the second parts.

In Example 46, the subject matter of any one of Examples 44-45 can optionally include: temporarily storing a number of two or four second parts of the plurality of processed data packets in the intermediate buffer.

Example 47 is a method for offloading data from a data processing device to a remote data processing device, the method comprising: receiving a plurality of second parts of processed data packets offloaded from the data processing device; receiving a notification from the processing device of the offload of the second parts; and storing the plurality of second parts of processed data packets offloaded from the data processing device in a memory of the remote data processing device.

In Example 48, the subject matter of Example 47 can optionally include that the notification of the offload is decoupled from the reception of the plurality of offloaded second parts of processed data packets.

In Example 49, the subject matter of any one of Examples 47-48 can optionally include: retrieving the plurality of second parts of processed data packets from the memory for further processing.

In Example 50, the subject matter of Example 49 can optionally include: retrieving the plurality of second parts of processed data packets from the memory based on the notification received.

Example 51 is a computer readable non-transitory medium on which computer instructions are stored which when executed by a computer cause the computer to perform the method of one of Examples 33 to 50.

Example 52 is a device for offloading data from a data processing device to a remote data processing device, the device comprising: means for processing a plurality of data packets according to a communication protocol to provide a plurality of processed data packets each comprising a first part and a second part; means for offloading the second parts of the plurality of processed data packets to the remote data processing device; and means for notifying the remote processing device of the offload of the second parts of the plurality of processed data packets.

In Example 53, the subject matter of Example 52 can optionally include that the notifying of the offload is decoupled from the offloading of the second parts of the plurality of processed data packets.

Example 54 is a device for offloading data from a data processing device to a remote data processing device, the device comprising: means for receiving a plurality of second parts of processed data packets offloaded from the data processing device; means for receiving a notification from the processing device of the offload of the second parts; and means for storing the plurality of second parts of processed data packets offloaded from the data processing device in a memory of the remote data processing device.

In Example 55, the subject matter of Example 54 can optionally include that the notification of the offload is decoupled from the reception of the plurality of offloaded second parts of processed data packets.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. An apparatus of a user equipment (UE) configured for operating in accordance with a cellular communication network protocol, the apparatus comprising:
   processing circuitry; and
   memory, including layer-two (L2) buffer storage, the L2 buffer space being split between a first portion and a second portion,
   wherein to perform data processing per transmission time interval (TTI), the processing circuitry is configured to:
   decode downlink (DL) protocol data units (PDUs) received over a radio link, the DL PDUs including a header portion and a data portion, the DL PDUs being received within one or more TTIs, each TTI comprising a duration of a single transmission on the radio link;
   wherein for DL PDUs received within each of the one more TTIs, for each TTI the processing circuitry is configured to:
   store the header portions of the DL PDUs of an associated TTI in the first portion of the L2 buffer space;
   store the data portions of the DL PDUs of the associated TTI in the second portion of the L2 buffer space; and
   generate signaling to trigger L2 processing of the data portions of the DL PDUs of the associated when storage of all the data portions of the DL PDUs received within the associated TTI in the second portion of the L2 buffer space is completed,
   wherein the L2 processing comprises radio link control (RLC) layer processing in accordance with the cellular communication network protocol.

2. The apparatus of claim 1, wherein the processing circuitry is further configured to perform reordering of the DL PDUs according to a radio-link control (RLC) retransmission protocol prior to generating the signaling to trigger the L2 processing.

3. The apparatus of claim 1, wherein the processing circuitry comprises a communications processor (CP) and an applications processor (AP).

4. The apparatus of claim 3, wherein the CP is configured to decode the DL PDUs, store the header portions of the DL PDUs in the first portion of the L2 buffer space, store the data portions of the DL PDUs in the second portion of the L2 buffer space, and generate the signaling for the AP to trigger the L2 processing by the AP.

5. The apparatus of claim 4 further comprising an interface coupling the CP to the AP.

6. The apparatus of claim 5 wherein the CP is configured to provide the data portions of the DL PDUs to the interface for storage in the second portion of the L2 buffer space, wherein the second portion of the L2 buffer space is associated with the AP.

7. The apparatus of claim 1, wherein prior to decoding the DL PDUs, the processing circuitry is configured to retrieve the DL PDUs from a physical layer (L1) buffer.

8. The apparatus of claim 7,
   wherein the cellular communication network protocol comprises a fifth generation (5G) cellular communication network protocol.

9. The apparatus of claim 8 further comprising radio-frequency processing circuitry configured to receive downlink signals through two or more antenna and provide the DL data packets to the processing circuitry.

10. A non-transitory computer-readable storage medium that stores instructions for execution by processing circuitry of a user equipment (UI) configured for operating in accordance with a cellular communication network protocol, wherein to perform data processing per transmission time interval (TTI), the instructions are to configure the processing circuitry to:
    decode downlink (DL) protocol data units (PDUs) received over a radio link, the DL PDUs including a header portion and a data portion, the DL PDUs being received within one or more TTIs, each TTI comprising a duration of a single transmission on the radio link;
    wherein for DL PDUs received within each of the one more TTIs, for each TTI the processing circuitry is configured to:
    store the header portions of the DL PDUs of an associated TTI in the first portion of the L2 buffer space;
    store the data portions of the DL PDUs of the associated TTI in the second portion of the L2 buffer space; and
    generate signaling to trigger L2 processing of the data portions of the DL PDUs of the associated TTI when storage of all the data portions of the DL PDUs received within the associated TTI in the second portion of the L2 buffer space is completed,
    wherein the L2 processing comprises radio link control (RLC) layer processing in accordance with the cellular communication network protocol.

11. The non-transitory computer-readable storage medium of claim 10, wherein the processing circuitry is further configured to perform reordering of the DL PDUs according to a radio-link control (RLC) retransmission protocol prior to generating the signaling to trigger the L2 processing.

12. The non-transitory computer-readable storage medium of claim 10, wherein the processing circuitry comprises a communications processor (CP) and an applications processor (AP).

13. The non-transitory computer-readable storage medium of claim 12, wherein the CP is configured to decode the DL PDUs, store the header portions of the DL PDUs in the first portion of the L2 buffer space, store the data portions of the DL PDUs in the second portion of the L2 buffer space, and generate the signaling for the AP to trigger the L2 processing by the AP.

14. The non-transitory computer-readable storage medium of claim 13 wherein the CP is configured to provide the data portions of the DL PDUs to an interface for storage in the second portion of the L2 buffer space, wherein the second portion of the L2 buffer space is associated with the AP.

15. The non-transitory computer-readable storage medium of claim 10, wherein prior to decoding the DL PDUs, the processing circuitry is configured to retrieve the DL PDUs from a physical layer (L1) buffer.

16. The non-transitory computer-readable storage medium of claim 15, wherein the cellular communication network protocol comprises a fifth generation (5G) cellular communication network protocol.

17. A method performed by processing circuitry of a user equipment (UE) configured for operating in accordance with a cellular communication network protocol, wherein to perform data processing per transmission time interval (TTI), the method comprises:

splitting memory for layer-two (L2) buffer storage between a first portion and a second portion;

decoding downlink (DL) protocol data units (PDUs) received over a radio link, the DL PDUs including a header portion and a data portion, the DL PDUs being received within one or more TTIs, each TTI comprising a duration of a single transmission on the radio link;

wherein for DL PDUs received within each of the one more TTIs, for each TTI the processing circuitry is configured to:

storing the header portions of the DL PDUs of an associated TTI in the first portion of the L2 buffer space;

storing the data portions of the DL PDUs of the associated TTI in the second portion of the L2 buffer space; and generating signaling to trigger L2 processing of the data portions of the DL PDUs of the associated TTI when storage of all the data portions of the DL PDUs received within the associated TTI in the second portion of the L2 buffer space is completed, wherein the L2 processing comprises radio link control (RLC) layer processing in accordance with the cellular communication network protocol.

* * * * *

UNITED STATES PATENT AND TRADEMARK OFFICE
CERTIFICATE OF CORRECTION

PATENT NO. : 11,019,184 B2
APPLICATION NO. : 16/549696
DATED : May 25, 2021
INVENTOR(S) : Leucht-Roth et al.

It is certified that error appears in the above-identified patent and that said Letters Patent is hereby corrected as shown below:

In the Claims

In Column 15, Line 59, in Claim 1, after "associated", insert --TTI--

In Column 16, Line 33, in Claim 10, delete "(UI)" and insert --(UE)-- therefor

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*